United States Patent [19]

Schweder et al.

[11] 4,301,386
[45] Nov. 17, 1981

[54] ROTOR LAMINAE ASSEMBLY FOR A CAST ROTOR DYNAMOELECTRIC MACHINE

[75] Inventors: Walter M. Schweder, Schenectady; Henry G. Lenz, Scotia, both of N.Y.

[73] Assignee: General Electric Co., Schenectady, N.Y.

[21] Appl. No.: 824,104

[22] Filed: Aug. 12, 1977

[51] Int. Cl.³ .............................................. H02K 9/00
[52] U.S. Cl. ...................................... 310/59; 310/61; 310/65; 310/216
[58] Field of Search ..................................... 310/58–62, 310/64, 65, 216, 217, 261, 264, 265, 42, 52, 51

[56] References Cited

U.S. PATENT DOCUMENTS

| | | | |
|---|---|---|---|
| 890,577 | 6/1908 | Richards | 310/61 |
| 996,927 | 7/1911 | Ihlder | 310/65 |
| 2,413,525 | 12/1946 | Smith | 310/65 |
| 2,504,824 | 4/1950 | George | 164/333 |
| 3,684,906 | 8/1972 | Lenz | 310/64 |

*Primary Examiner*—R. Skudy
*Attorney, Agent, or Firm*—Vale P. Myles

[57] ABSTRACT

A rotor assembly for a dynamoelectric machine is characterized by incorporating three different sets of rotor laminations each of which is provided with punched apertures that respectively form conductor slots arcuately spaced around the periphery of the laminae, a plurality of axial coolant passageways extending through the assembly near its inner diameter, a plurality of arcuately spaced radial ducts at axial intervals along the rotor, and vent passageways connecting the radial ducts to the axial coolant passageways to enable cooling air to be forced through the coolant passageways and the vent apertures into the radial ducts and thence into the air gap of the machine when the rotor is assembled in operating position. The rotor of the invention is particularly characterized by incorporating radial cooling ducts that extend between each adjacent pair of conductor slots from the periphery of the rotor to points substantially below the bottoms of the conductor slots in the rotor laminae. All of the laminae are stacked in aligned position and compressed to form tight seals therebetween that prevent molten metal from flowing out of the conductor slots into the interstices between the respective laminations of the assembly during a rotor casting operation.

7 Claims, 6 Drawing Figures

ROTOR LAMINAE ASSEMBLY FOR A CAST ROTOR DYNAMOELECTRIC MACHINE

BACKGROUND OF THE INVENTION

The invention relates to rotor laminae assemblies for cast rotors used in the manufacture of dynamoelectric machines and more particularly it relates to such a rotor having radial cooling ducts connected to axial coolant passageways through the rotor assembly in a manner that enables rotor conductors to be cast in conductor slots of the assembly without impairing the cooling ducts or axial coolant passageways. The invention also makes it possible to cast the conductors of a rotor assembly without requiring the use of spacer pins, or spot welded collar sub-assemblies, separately inserted into the laminae assembly of the rotor during a casting operation to prevent the flow of casting metal from the conductor slots into cooling ducts of the assembly.

Prior to the present invention it was common practice to cast conductors in laminated rotor assemblies for dynamoelectric machines by utilizing various types of spacers to prevent molten metal from entering the rotor air ducts during the casting operation. For example, U.S. Pat. No. 2,368,296 discloses a method of forming radial ventilating passages in a cast rotor in which ring-shaped spacers are inserted between groups of laminations during the casting operation. After such a casting operation the rotor assembly is further treated to melt or dissolve the temporary spacers so they are easily removed from the rotor. In that patent the use of tin alloy, plaster or clay with a dissolvable binder is suggested for the ring-shaped spacers. The same inventor discloses in U.S. Pat. No 2,368,295 the use of cardboard or similar combustible material to form spacers in a rotor lamination during a casting operation. Similarly, in U.S. Pat. No. 2,607,968 there is described a method for casting dynamoelectric machine rotors with air ducts which are formed by spacers made of reinforced plaster material between the lamination sections of the rotor during a casting operation. Following the casting procedure, the plaster material is disintegrated by contacting it with water to wash the spacers from the air ducts.

Although the use of such dissolvable or frangible spacer materials is well-known, it is more common practice in the manufacture of relatively large dynamoelectric machine rotors to place a plurality of removable steel pins, or spot welded collar sub-assemblies, between sections of the rotor laminations to form the desired cooling ducts in the rotors. The use of such a reusable spacer procedure is shown, for example, in U.S. Pat. No. 2,504,824.

While the utilization of metal pins to form air ducts in cast rotors has become a preferred practice in the manufacture of dynamoelectric machines, relative to the use of frangible or dissolvable spacing members to form the cooling ducts, it has long been recognized that this method inherently has several disadvantages. In practicing this method it is necessary to utilize a relatively large number of individually placed steel pins to form the cooling ducts in a given rotor. Typically, the number of such pins will be around 1,000 for a medium size rotor, i.e., a rotor about 3 feet in length and 2 feet in diameter. Since these pins must be individually positioned in the rotor as its lamination assembly is built up prior to a casting operation, and since the pins must subsequently be individually extracted from between the laminations following the casting operation, the labor cost involved in this method is substantial. In addition to the installation and removal of the pins, care must be taken to carefully clean the pins between each use to assure their close precision fit in subsequent casting operations so that molten metal does not flow between them and the adjacent rotor laminations. Moreover, the normal use and handling of such pins inevitably results in mechanical abuse and wear that necessitates frequent replacement of the pins. Of course, such replacement costs are a substantial manufacturing expense that it would be desirable to avoid, if possible.

Well before the development and commercialization of such removable ring or pin techniques for casting conductors in laminated rotors, it was known to fabricate laminated rotors of a series of differently punched laminae arranged to form axial coolant passageways connected to radial coolant ducts by venting channels. An example of several early configurations of that type of ventilating arrangement in a wound rotor structure is shown in U.S. Pat. No 890,577 which issued on June 9, 1908. However, since such early rotor cooling arrangements were not suitable for use in manufacturing cast conductor rotors, due to the fact that they would allow molten conductor metal to enter the coolant passageways therein, it remains common practice to manufacture rotors having cast conductors by the aforementioned movable spacer-pin methods.

In more recent times, as shown in U.S. Pat. No. 3,684,906, which issued on Aug. 15, 1972 to one of the applicants named herein, a relatively small castable rotor for regrfrigerant compressor motors was disclosed in which a plurality of sets of differently configured rotor laminae were arranged to form tortuous paths through the rotor from arcuately spaced axial refrigerant-carrying passageways, through intermediate vent passageways, to arcuately disposed radial ducts. Such small refrigerant compressor motors are distinguished from the present invention by requiring the use of radial coolant ducts in two different sets of laminations so that the radial ducts in either such set do not extend the full depth of the adjacent conductor slots. Furthermore, the flow-restricting nature of the small, tortuous ducts used to carry refrigerant through such rotors are not suitable for use as coolant passageways for larger air-cooled rotors in which large volumes of air must be moved through the rotor ducts with little pressure loss.

OBJECTS OF THE INVENTION

Accordingly, it is a primary object of the present invention to provide a rotor laminae assembly for a dynamoelectric machine having cast rotor conductors and spaced radial cooling ducts connected to axial coolant passageways, by adjoining apertures in a plurality of differently shaped laminae, in an assembly that is more economical to manufacture and efficient to operate than those heretofore known.

Another object of the invention is to provide a laminated rotor assembly having cast conductors in combination with radial cooling ducts that are formed to extend past the entire radial depth of each adjacent conductor slot and on into the central venting passageway portions of the assembly.

Yet another object of the invention is to provide a cast-rotor laminae assembly for a dynamoelectric machine having three sets of differently configured rotor laminations arranged in recurring patterns to provide arcuately and axially spaced coolant ducts extending from the periphery of the rotor past the entire length of the conductor slots into overlapping relationship with venting apertures in adjacent laminae, which in turn are in communication with axial coolant passageways formed through the main rotor laminations.

A further object of the invention is to provide a cast-rotor assembly having an efficient cooling system that results in the rotor having added heat storage capacity which increases the stalled time capability of the rotor.

Additional objects and advantages of the invention will be apparent from the description of it presented below considered in conjunction with the accompanying drawings

SUMMARY OF THE INVENTION

In one preferred embodiment a rotor laminae assembly having cast conductors is provided with a plurality of spaced radial cooling ducts that extend from the periphery of the rotor to points well below the bottoms of adjacent conductor slots. The cooling ducts are formed by punching a first set of rotor laminae in a predetermined pattern that includes coolant slot punchings, as well as conductor slots and apertures that form part of the axial cooling air passageways through the assembly. A differently configured set of vent laminae are punched to form conductor slots therein and a plurality of arcuately spaced vent apertures that are arranged to be positioned in overlapping relationship with both the axial coolant passageways in the first set of laminae of the assembly and with the inner portion of predetermined cooling ducts. These two sets of laminae are arranged in recurring patterns with a third set of main rotor laminae that are punched to form a plurality of conductor slots and a plurality of apertures that form axial cooling air passageways through the assembly. The laminae are all stacked with their respective conductor slots in alignment, and compressed together in fluid type relationship so that molten metal cannot flow between adjacent lamina from the conductor slots into adjacent cooling ducts. Electrical conductors are cast in each of the conductor slots and a pair of integrally cast annuli are formed around the outer portions of the two end-most laminae to interconnect all of the conductor bars in a well-known manner. After the conductor bars and end annuli have been formed on the rotor laminae assembly, the outer peripheral surface of the cooling duct laminae are machined away to open the outer ends of the cooling ducts. Thus, cooling air can be forced through the axial cooling passageways in the main rotor laminae into the large vent apertures of the intermediate laminae and sent, with very little pressure drop, into the radial cooling ducts and out of the rotor into an adjacent gap, between it and a stator, when the rotor is press fit or otherwise supported on a suitable shaft and mounted for rotation within such a stator in a manner well-known in the art.

BRIEF DESCRIPTION OF THE DRAWING

FIG. 1A is an enlarged, fragmentary, side elevation of part of the machine shown in FIG. 1 illustrating the details of one group of three different types of laminations used to form the cooling passageways and ducts of the invention.

DESCRIPTION OF THE PREFERRED EMBODIMENT

Figure 1:
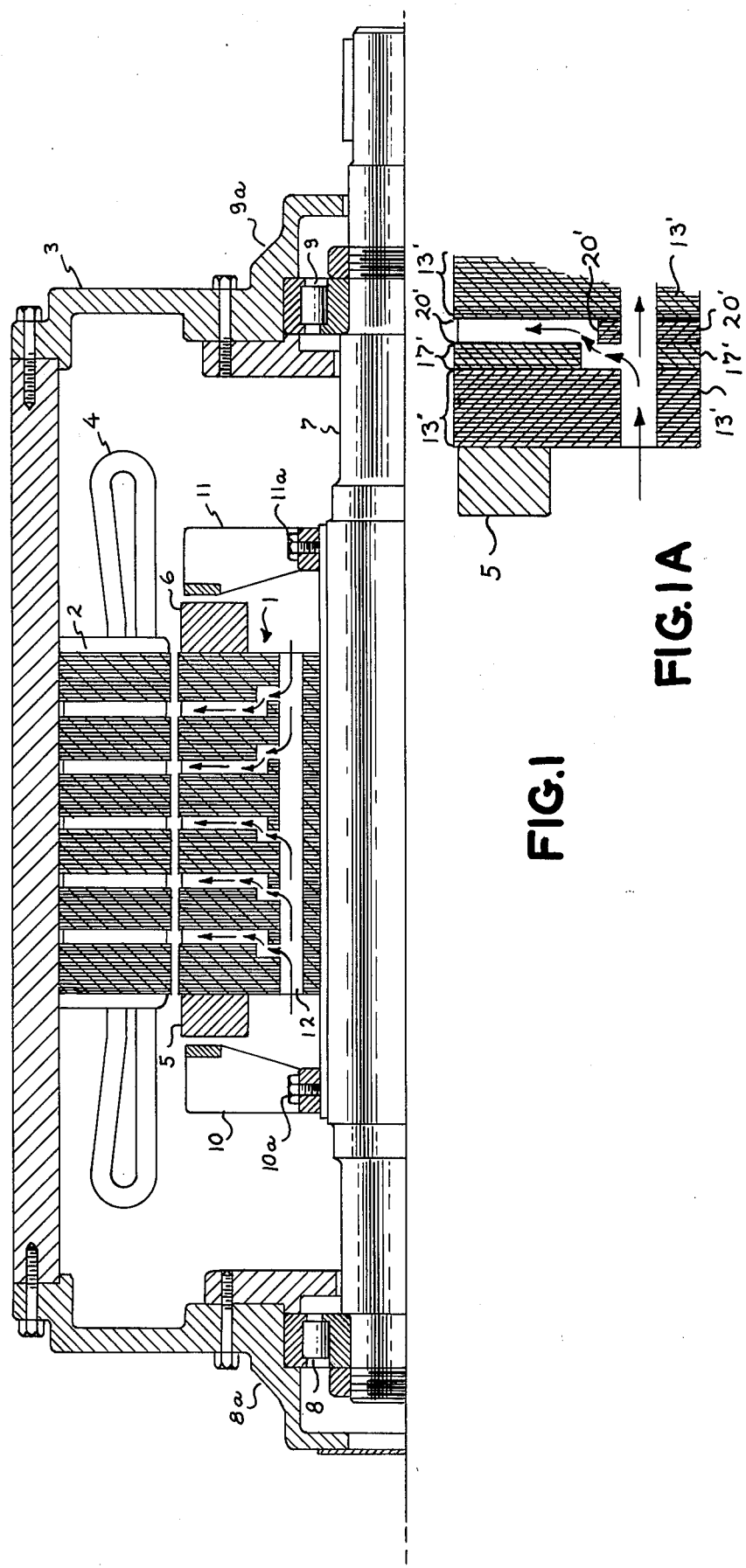
FIG. 1 is a side elevation, partly in cross-section, illustrating the upper half of a dynamoelectric machine having a cast-rotor and laminae assembly constructed pursuant to the present invention.

To facilitate a clear understanding of the present invention a rotor laminae assembly 1 constructed pursuant to the teaching of the invention is illustrated in FIG. 1, mounted in an otherwise conventional dynamoelectric machine for rotation relative to a stator 2 and housing 3 thereof. The stator 2 is wound with a conventional winding 4 while the rotor 1 is provided with a plurality of cast conductors arranged in arcuately spaced axial conductor slots adjacent the peripheral surface thereof in a manner that will be more fully described below. These axial conductors of the rotor 1 are interconnected at the opposite ends thereof by a pair of cast annuli 5 and 6, seen in cross-section in FIG. 1. A suitable steel shaft 7 is press fit or otherwise mounted in fixed relationship within the laminae assembly of rotor 1 and is mounted for rotation on a pair of rolling element (or sliding element) bearing assemblies 8 and 9, which in turn are mounted in a conventional manner in suitable hubs 8a and 9a in the housing 3. Also mounted on the shaft 7 are a pair of fans 10 and 11 that force air over the end windings. Air passes through openings in these fans into the opposite ends of a plurality of axial coolant passageways one of which is designated by the numeral 12 in FIG. 1, as shown by the arrows entering the passageway 12. These fans may be mounted in any conventional manner such as by the mounting bolts 10a and 11a shown in FIG. 1 or by being press fit on the shaft 7. Alternatively, suitable fans may be integrally cast with the annuli 5 and 6, as is well-known. In alternative forms of such machines fans are cast integral with the rotor end rings or annuli 5 and 6 to project axially outward therefrom. In such an alternative fan arrangement as well as in the arrangement shown in FIG. 1, the cooling air pressure head which draws the air into the ducts (12, etc.) is produced by centrifugal force in the radial ducts of the rotor. As will be more fully explained below, an advantage of the invention is that the radial ducts are longer than the cast rotor bars, so produce a greater head pressure and induce more air flow to improve cooling of the rotor and stator.

Before describing the unique features of the rotor laminae assembly 1 in greater detail with reference to FIG. 1, a description will be given of the distinguishing features of the three different sets of laminae used in the assembly, as they are illustrated, respectively, in FIGS. 2, 3 and 4. Considering first the main rotor lamina 13 shown in FIG. 2, it will be seen that this lamina is formed with apertures that respectively define a plurality of conductor slots 14, 14a, 14b, etc. that are arcuately spaced adjacent the periphery of the lamina. Other apertures in the lamina 13 form a plurality of coolant-receiving passages 15, 15a, 15b, etc. that are arcuately spaced around the inner portion of lamina 13 between the inner ends of the conductor slots 14, 14a, etc. and the inner diameter 13a of the annular lamina 13.

It will be understood that in the rotor laminae assembly 1 shown in FIG. 1 there will be a plurality of the substantially flat, annular main rotor laminae substantially identical to the lamina 13 shown in FIG. 2, arranged in the novel manner of the invention which will be more fully described below. In addition to the conductor slot apertures and the axial coolant-passageway-defining apertures formed in the main rotor laminae, each of these laminae, such as the lamina 13, is provided with a slot 16 punched in its inner diameter edge 13a to provide a means for quickly aligning respective sets of the laminae when they are stacked preparatory to having conductors cast in the conductor slots 14–14b, et cetera.

Figure 2:
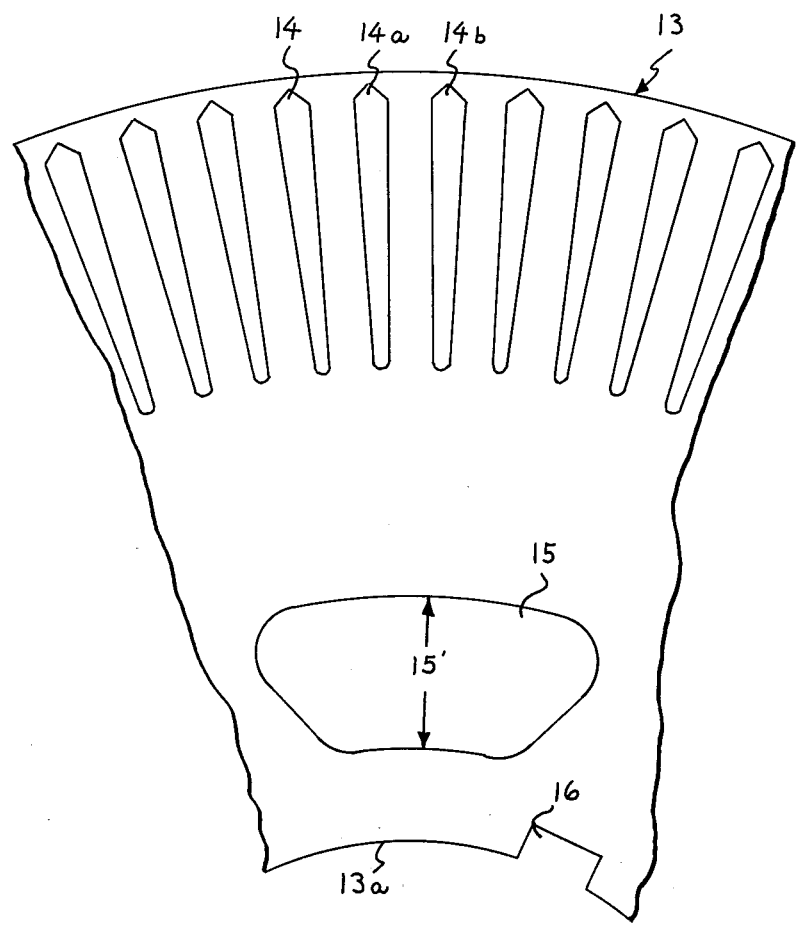
FIG. 2 is a top plan view of a fragment of a main rotor lamination for the laminae assembly shown in FIG. 1.
Figure 3:
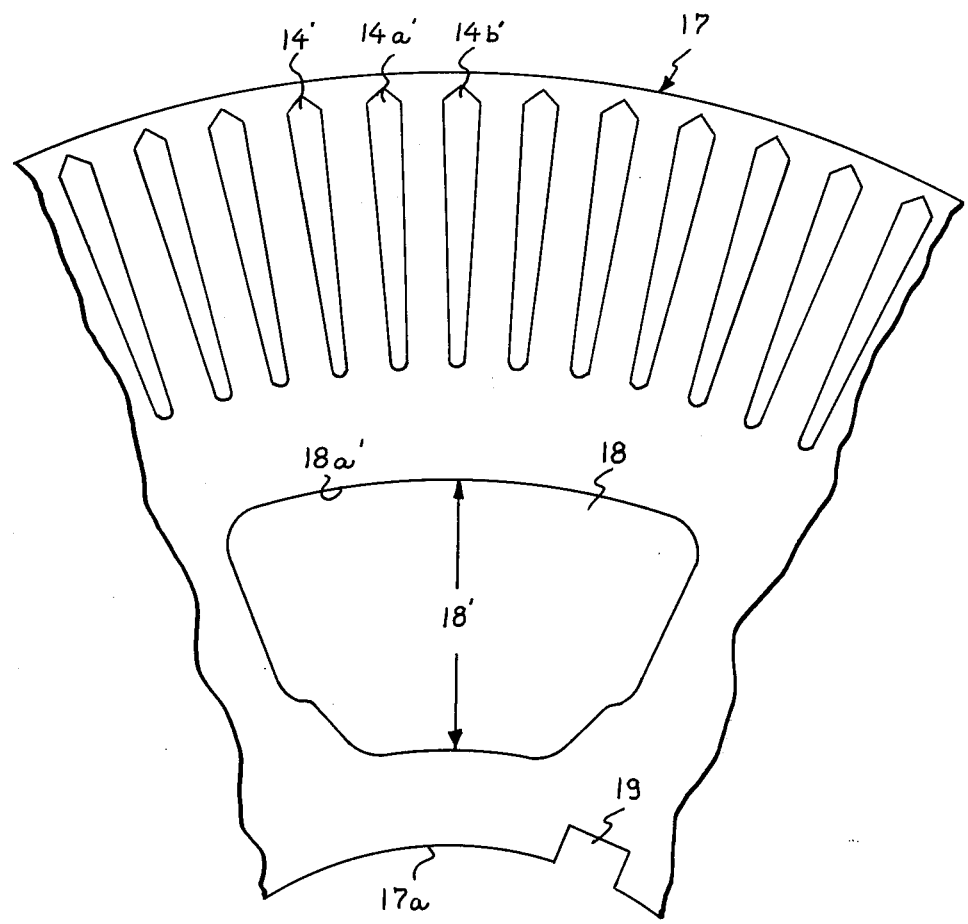
FIG. 3 is a top plan view of a venting lamina for the laminae assembly shown in FIG. 1.

In FIG. 3 there is shown a fragment of a substantially flat, annular vent lamina 17 that is provided with apertures arranged pursuant to the invention to define respectively a plurality of conductor slots 14', 14a', 14b', etc. which, it will be understood, are substantially identical in configuration to the conductor slots 14–14b, etc. in the main rotor laminae such as the lamina 13 shown in FIG. 2. These conductor slots 14'–14b' are also arcuately spaced adjacent the periphery of the lamina 17 with spacings matching those of the conductor slots in the main rotor laminae 13. Each of the vent laminae, such as the lamina 17, is also provided with a plurality of vent apertures 18, 18a, 18b, etc., arcuately spaced between the inner ends of the conductor slots 14'–14b', etc. and the inner diameter 17a of the lamina. Pursuant to the present invention each of the vent apertures 18a–18b, etc. is formed with a radial dimension, such as that designated by the arrow 18' in FIG. 3, substantially greater than the maximum radial dimension, such as that designated by the arrow 15' in FIG. 2, of the coolant passageway 15 in lamina 13. Accordingly, when one of the main rotor lamina 13 is positioned adjacent one of the vent lamina 17 it will be appreciated that a substantial portion of each vent aperture 18a–18b, etc. overlaps the aligned coolant passageway apertures 15–15b of the main rotor lamina. The purpose of this overlapping arrangement will be discussed below relative to the low pressure drop movement of cooling air through the laminae assembly of the invention when the rotor is operated.

It will be noted that the vent lamina 17 also is provided with an aligning slot 19. This slot is used in the same manner as the slot 16 in main rotor lamina 13, to align the vent laminae 17 (and its counterparts) when they are stacked for a casting operation. Again, it should be noted that each of the other vent laminae used in rotor assembly 1 of the invention is substantially identical to the vent lamina 17 shown in FIG. 3.

Figure 4:
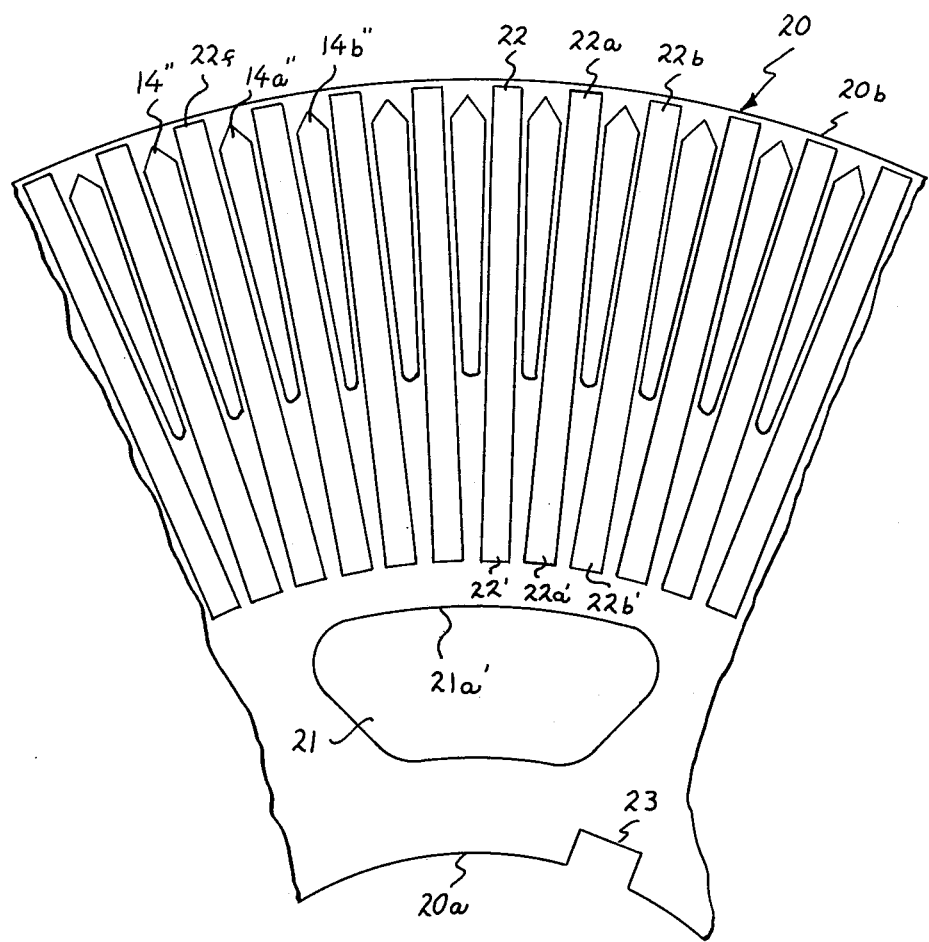
FIG. 4 is a top plan view of a fragment of a cooling duct lamination for the rotor laminae assembly of FIG. 1.

Finally, the laminae assembly 1 includes a plurality of substantially flat, annular duct laminae such as the lamina 20 shown in fragmentary view in FIG. 4. Each duct lamina, such as the lamina 20, is punched to form apertures therein that define respectively a plurality of conductor slots 14'', 14a'', 14b'', etc. which are substantially identical in shape to the conductor slots formed respectively in the main rotor lamina 13 and the vent lamina 17 described above with reference to FIGS. 2 and 3. Slots 14'', 14a'', 14b'' may be different in size and/or shape from slots 14, 14a and 14b, and 14', 14a' and 14b' for the purpose of increasing the width of coolant duct slots 22, 22a and 22b, or the width of the lamination that separates the conductor slots (14'') from the duct slots (22, etc.), or for the purpose of standardization and commonality between different electrical designs, i.e., slot shapes and number of slots. As in those cases, the conductor slots 14''–14b'', etc. are arcuately spaced adjacent the periphery of the lamina 20.

In addition to the conductor slots, a plurality of coolant passageways 21, 21a, 21b, etc. are arcuately spaced between the inner ends of the conductor slots 14''–14b'', etc. and the inner diameter 20a of the lamina 20. It will be appreciated that the conductor slots and coolant passageways in the lamina 20 are arranged for substantial alignment with the like apertures in the main rotor laminae such as lamina 13 shown in FIG. 2. While the coolant slots 22, 22a, 22b, etc. are shown as rectangles in FIG. 4, the slots can be made to have other shapes. One improved configuration of coolant duct is shown, for example, in FIG. 5 wherein coolant slots 22A, 22B, 22C are provided with flared openings at their respective outer ends. The advantages of this laminae configuration are reduction in air duct noise and improved machining of the rotor surface when the periphery is removed to open the coolant ducts.

Figure 5:
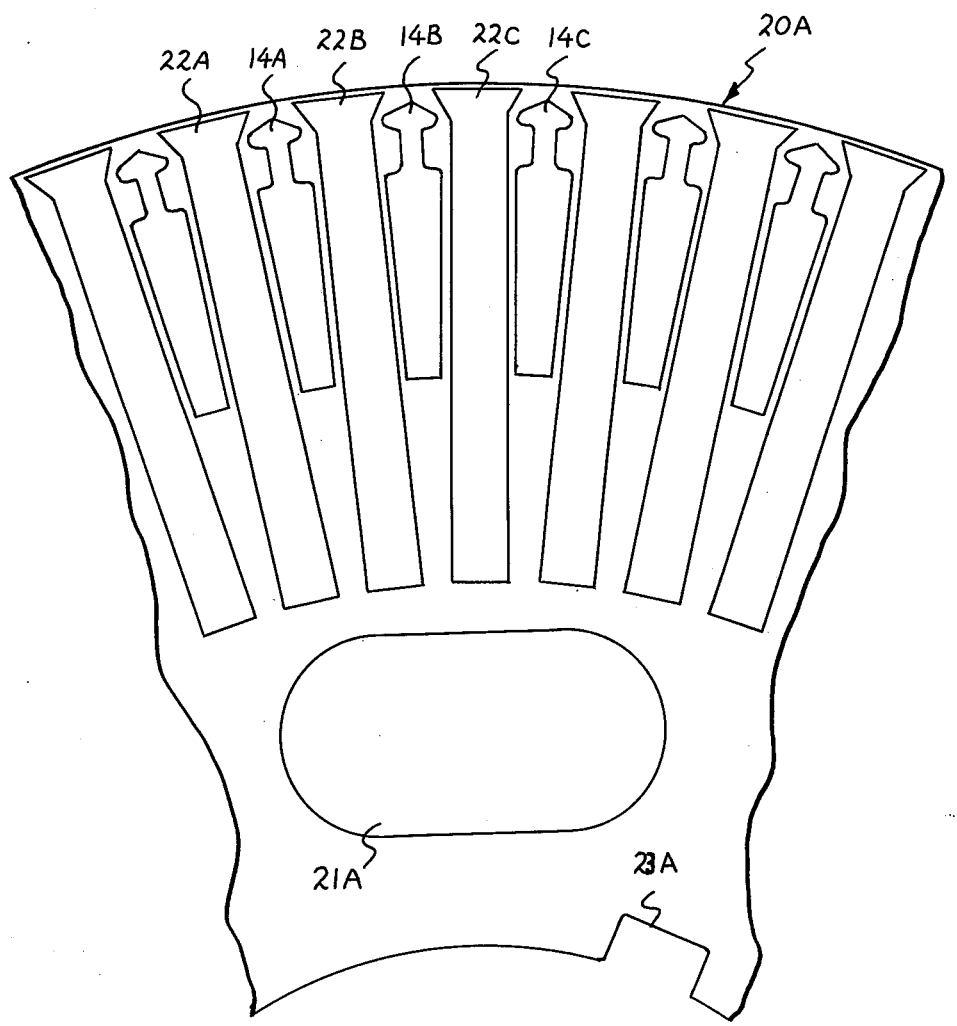
FIG. 5 is a top plan view of a fragment of a cooling duct lamination that can be used instead of the laminae of FIG. 4 in making the rotor assembly of FIG. 1.

It will be noted that conductor slots 14A, 14B and 14C, etc. in the lamination of FIG. 5 differ in form from the conductor slots 14'', 14a'' and 14b'' shown in FIG. 4, in order to further illustrate the flexibility of the invention. Likewise the coolant passage 21A shown in the alternative form of punching 20A in FIG. 5, differs in outline from the functionally related passageways 21–21b in punching 20 shown in FIG. 4.

Returning now to a description of the invention in the embodiment thereof using the configuration of laminae shown in FIGS. 2, 3 and 4, it will be seen that each of the duct laminae, like lamina 20, is also provided with a plurality of punched, or otherwise machined coolant duct slots 22, 22a, 22b, etc. that each extend, respectively, from the periphery of the lamina to a point, such as the points 22', 22a', 22b', shown in FIG. 4, located between the inner ends of the conductor slots and the outer extent of the adjacent coolant passageways 21, 21a, 21b, et cetera. For example, as seen in FIG. 4, the innermost points of the duct slots 22–22b terminate at the points 22'–22b' adjacent the outer extent 21a' of the edge of axial coolant passageway 21a.

It will also be seen by reference to FIG. 4 that these points 22'–22b', etc. are radially positioned between the outer extent 21a' (for example) of the respective coolant passageways 21–21b, etc. and the outer extent (18' seen in FIG. 3) of the adjacent vent apertures such as vent apertures 18–18b shown in the vent duct 17 illustrated in FIG. 3, when such a vent lamina is disposed adjacent a duct lamina 20 in the laminae assembly of the invention. Thus, the inner end of virtually every duct slot 22–22b, etc. is placed in overlapping relationship with an adjacent vent aperture 18–18b, etc. and each vent apertures 18–18b etc. is positioned in overlapping relationship with a coolant passageway 15–15b in adjacent main rotor laminae, such as the lamina 15 shown in FIG. 2.

Finally, the coolant duct lamina 20 shown in FIG. 4 and each of the substantially identical associated coolant duct laminae in assembly 1 are each provided with an alignment notch 23 formed in the inner diameter thereof for aligning these laminae for a casting operation in the manner described above with reference to the other laminae of the assembly 1. It should also be understood that various conventional materials may be used to form the respective laminae used in making the laminated rotor assembly of the invention. In this embodiment of the invention a suitable conventional magnetic steel is used to form each of the laminae, as is well-known, in the prior art. It should be understood, though, that while conventional magnetic steels are used for each lamination, the different types of laminae may (and in the preferred embodiment do) use different types of steel. For example, laminations 13 and 17 in this embodiment are made of silicon steel with inorganic coatings, for performance, while lamina 20 was made of a non-coated steel to optimize processing.

To complete the rotor laminae assembly 1 of the invention in the form illustrated in FIG. 1, the preselected plurality of main rotor laminae 13, vent laminae 17, and duct laminae 20 are arranged in adjacent groups and aligned with each other to place their respective conductor slots in substantial alignment. Such groupings of the main rotor laminae are designated clearly in the enlarged view of FIG. 1A by the numeral 13', a group of vent laminae adjacent thereto is designated in FIG. 1A by the numeral 17', and a group of duct laminae are designated in FIG. 1A by the numeral 20'. Of course, such groupings are repeated along the assembly 1, as shown in FIG. 1. With these respective sets of laminae thus arranged and the associated alignment slots 16, 19 and 23 therein positioned to align the respective conductor slots as desired, the laminae assembly is compressed together to form liquid tight seals between adjacent laminae so that molten metal cannot escape from the conductor slots into the adjacent cooling ducts or vent passageways. The cast conductors and integrally cast annuli 5 and 6 that join the conductors together at the opposite ends thereof are effective, when cooled and hardened, to hold the rotor laminae assembly 1 together. Pursuant to the present invention each of the duct laminae, such as lamina 20, is formed so that one of the coolant ducts, such as duct 22f, is positioned between each adjacent pair of conductor slots, such as the pair of conductor slots 14"-14a" shown in FIG. 4.

This intimate relationship between the coolant ducts and the conductor slots is further maximized pursuant to the invention by maintaining the spacing between the sides of each duct slot and the conductor slots closest thereto in the range of 0.030 to 0.100 inches. Thus, the entire depth of each conductor slot is positioned in optimum heat exchange relationship with the adjacent coolant ducts. Furthermore, pursuant to the invention, each of the coolant duct slots 22-22b, etc. (or 22A-22C, etc. in FIG. 5) is formed to be approximately 100 percent deeper in a radial direction than the conductor slots adjacent to them. This relationship is effective to assure a high volume flow of cooling air through the venting apertures in adjacent venting lamina, such as lamina 17, into the cooling ducts. Also, pressure loss in the cooling air is minimized in the preferred embodiment of the invention being described by making the area of each vent aperture 18-18b, etc. about twice as large as the coolant passageway apertures 21-21b, etc. with which they cooperate.

Each of the coolant duct slots 22-22b, etc. are also formed to extend radially outward beyond the conductor slots adjacent thereto by at least 0.02 inches. This relative arrangement of the duct slots with the conductor slots makes it possible to easily machine the peripheral surface 20b of the duct laminae 20 to open the outer ends of the ducts 22-22b, etc. after conductors are cast in the conductor slots, thereby to enable air to flow through the laminae assembly in the manner explained above. It will be understood that during such a conductor casting operation the ends of the axial passageways 15-15b, etc. in the outermost main rotor laminae 13 will be suitably shielded in a conventional manner to prevent molten casting metal from entering the passageways through the outer laminae.

Those skilled in the art will recognize that various combinations of the three sets of laminae described above may be assembled to make different forms of cooling passageways and cooling ducts through a rotor laminae assembly pursuant to the invention. However, as shown in FIG. 1 of the drawing in the preferred embodiment of the invention, substantially equal numbers of vent laminae 17 and duct laminae 20 are arranged in cooperating sets with a group of duct laminae disposed adjacent a group of vent laminae at preselected axially spaced intervals between larger groups of main rotor laminae 13 as designated in FIG. 1A by the respective numerals 13', 17' and 20'. This arrangement enables a large volume of cooling air to be forced through the rotor with a desirably small loss of pressure. Thus, as shown by the arrows in FIG. 1, cooling air is forced by rotation of the shaft 7, and resultant centrifugal force in ducts 22, 22a and 22b, etc. mounted thereon, to move axially through the passageway 12 defined by the apertures 15-15b, etc., 18-18b etc., and ducts 21-21b etc., respectively, in the main rotor laminae 13', the vent laminae 17' and the duct laminae 20'. As can be seen, the air flows from the axial passageway 12 and its arcuately spaced counterparts into the vent passageways formed by the vent apertures 18-18b, etc. in the venting laminae 17 and thence into the coolant ducts, the inner ends of which overlap the vent apertures.

It will be recognized that substantially all of the cooling ducts 22-22b, etc. have their inner ends overlapping an associated venting aperture 18-18b etc. in an adjacent venting lamina 17, due to the depth and close spacing of the ducts in the duct laminae 20. However, it can also be seen that one or two of the cooling ducts in each duct lamina will not be in overlapping relationship with a venting aperture in the embodiment of the invention described herein. In the event that the cooling requirements for a given rotor laminae assembly are such that each cooling duct 22-22b etc. must receive cooling air from one of the venting apertures 18-18b to avoid the formation of even one or two hot spots on the rotor, the aligning slot 19 in the venting laminae 17 may be arranged such that alternate vent lamina can be reversed or turned over as they are stacked in assembled position. This arrangement will cause each of the cooling ducts to be positioned in overlapping relationship with one of the venting apertures so that each cooling duct receives coolant from the axial passageways in the main rotor laminae. However, it has been found that for most commercial applications the preferred embodiment of the invention provides adequate cooling for the rotor and its associated stator.

Other modifications and alternative forms of the invention will be apparent to those skilled in the art from the description of it presented herein; accordingly, it is our intention to encompass within the scope of the following claims the true spirit and limits of the invention.

What we claim as new and desire to secure by Letters Patent of the United States is:

1. A rotor laminae assembly for a dynamoelectric machine having cast axial conductors and radial ventilating ducts extending between said conductors at axially spaced intervals, characterized by the improvement comprising:

a. a plurality of substantially flat, annular main rotor laminae each formed with apertures therein to define, respectively, a plurality of conductor slots arcuately spaced adjacent to the periphery of the laminae and a plurality of coolant passageways arcuately spaced between the inner ends of said conductor slots and the inner diameter of the laminae,
   b. a plurality of substantially flat, annular vent laminae each provided with apertures that define, respectively, a plurality of conductor slots arcuately spaced adjacent to the periphery of the laminae and a plurality of vent apertures arcuately spcaced between the inner ends of said conductor slots and the inner diameter of the laminae, each of said vent apertures being formed with a radial dimension substantially greater than the maximum radial dimension of the coolant passageway formed in said main laminae,
   c. a plurality of substantially flat, annular duct laminae each provided with apertures that define, respectively, a plurality of conductor slots arcuately spaced adjacent to the periphery of the laminae, a plurality of coolant passageways arcuately spaced between the inner ends of the conductor slots and the inner diameter of the laminae, and a plurality of coolant duct slots extending from the periphery of the laminae to a point between the inner ends of the conductor slots and the outer extent of the coolant passageways, said point being radially positioned between said outer extent of the coolant passageways and the outer extent of the vent apertures in adjacent vent laminae thereby to place the inner end of each duct slot in overlapping relationship with an adjacent vent aperture and to position each vent aperture in overlapping relationship with a coolant passageway in adjacent main rotor laminae,
   d. said plurality of main rotor laminae, vent laminae and duct laminae being aligned with each other to place the conductor slots in alignment, and a plurality of cast electrical conductors disposed, respectively, in each of said conductor slots and joined together at the opposite ends thereof, respectively, by a pair of annuli cast with said conductors, said cast conductors being effective to hold the rotor laminae assembly together.

2. An invention as defined in claim 1 wherein each duct lamina is formed with one of said coolant duct slots between each adjacent pair of conductor slots, the spacing between the sides of each duct slots and the closest conductor slot being in the range of 0.030 to 0.100 inches.

3. An invention as defined in claim 2 wherein each coolant duct slot is formed to be approximately 100 percent deeper, in a radial direction, than the conductor slots adjacent thereto.

4. An invention as defined in claim 3 wherein said vent laminae and duct laminae are arranged in cooperating sets of about equal axial length, each set comprising a group of duct laminae disposed adjacent a group of vent laminae at axially spaced intervals between larger groups of main rotor laminae.

5. An invention as defined in claim 1 wherein all of said laminae are positioned sufficiently close together to prevent molten metal from flowing between them from the conductor slots.

6. An invention as defined in claim 3 wherein said coolant duct slots extend radially outward beyond the conductor slots by at least 0.02 inches.

7. An invention as defined in claim 5 in combination with a steel shaft force-fitted within the inner diameter of all of the annular laminae to support them for rotation on said shaft.

* * * * *